US007379034B2

(12) United States Patent
Yang

(10) Patent No.: US 7,379,034 B2
(45) Date of Patent: May 27, 2008

(54) PANEL DRIVING APPARATUS AND A DISPLAY PANEL WITH THE SAME

(75) Inventor: Hak-Cheol Yang, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 582 days.

(21) Appl. No.: 10/964,925

(22) Filed: Oct. 15, 2004

(65) Prior Publication Data

US 2005/0110705 A1 May 26, 2005

(30) Foreign Application Priority Data

Oct. 17, 2003 (KR) ..................... 10-2003-0072510

(51) Int. Cl.
*G09G 3/28* (2006.01)
*G09G 3/30* (2006.01)
*G09G 3/36* (2006.01)
*G06F 3/38* (2006.01)

(52) U.S. Cl. ............................ 345/60; 345/76; 345/87; 345/212; 315/169.3; 315/169.4

(58) Field of Classification Search .......... 345/55-100, 345/204-214; 315/169.1-169.4
See application file for complete search history.

(56) References Cited

U.S. PATENT DOCUMENTS 5,654,728 A * 8/1997 Kanazawa et al. ............ 345/68
5,760,753 A * 6/1998 Hayashi ........................ 345/60
6,400,344 B1 * 6/2002 Tsunoda et al. .............. 345/60
6,690,342 B2 * 2/2004 Yamamoto et al. ........... 345/60
6,781,322 B2 * 8/2004 Onozawa et al. ............. 345/60
6,906,706 B2 * 6/2005 Kosaka et al. ................ 345/60
7,173,579 B2 * 2/2007 Lee ............................. 345/60
7,242,373 B2 * 7/2007 Tomio et al. ................. 345/60

* cited by examiner

*Primary Examiner*—David L. Lewis
(74) *Attorney, Agent, or Firm*—H.C. Park & Associates, PLC

(57) ABSTRACT

A panel driving apparatus including an address power controller for blocking an address power source of at least two capacitors and coupling the panel capacitors during a period between a scan line signal and a next scan line signal, so that the panel capacitors share electric charges, and an address driver for generating display data in response to an address signal by performing a switching operation. Electric charges that are charged in a previous address electrode line and could be discarded to a ground terminal at a next address electrode line are shared between the panel capacitors, thus reducing power consumption and improving power efficiency during an addressing operation.

7 Claims, 9 Drawing Sheets

PANEL DRIVING APPARATUS AND A DISPLAY PANEL WITH THE SAME

CROSS REFERENCE TO RELATED APPLICATION

This application claims the benefit of and priority to Korean Patent Application No. 10-2003-0072510, filed on Oct. 17, 2003, which is hereby incorporated by reference for all purposes as if fully set forth herein.

BACKGROUND OF THE INVENTION

1. Field of the Invention

The present invention relates to a driving circuit of a display panel, and more particularly, to an address energy recovery circuit.

2. Discussion of the Related Art

FIG. 1 shows a conventional structure of a 3-electrode surface discharging type alternating current (AC) plasma display panel (PDP). Referring to FIG. 1, a PDP 1 includes a front glass substrate 100 and a rear glass substrate 106. Address electrode lines $A_1, A_2, \ldots, A_m$, upper and lower dielectric layers 102 and 110, Y electrode lines $Y_1, \ldots, Y_n$, X electrode lines $X_1, \ldots, X_n$, a phosphor layer 112, a barrier rib 114, and an MgO protective layer 104 are disposed between the front and rear glass substrates 100 and 106.

The address electrode lines $A_1, \ldots, A_m$ are formed in a predetermined pattern on the rear glass substrate 106 and covered with the lower dielectric layer 110. The barrier ribs 114 are formed on the lower dielectric layer 110 in parallel to the address electrode lines $A_1, \ldots, A_m$, and they divide a discharging region of each display cell and prevent optical cross talk between cells. The phosphor layer 112 is formed on the lower dielectric layer 110 and the sides of the barrier ribs 114.

The X electrode lines $X_1, \ldots, X_n$ and the Y electrode lines $Y_1, \ldots, Y_n$ are formed on a lower surface of the front glass substrate 100 orthogonally to the address electrode lines $A_1, \ldots, A_m$. An X and Y electrode pair cross with an address electrode to form a display cell. The X electrode lines $X_1, \ldots, X_n$ and the Y electrode lines $Y_1, \ldots, Y_n$ may include transparent electrode lines $X_{na}$ and $Y_{na}$, made of transparent conductive materials such as indium tin oxide (ITO), and metal electrode lines $X_{nb}$ and $Y_{nb}$, which improve electrode line conductivity. The upper dielectric layer 102 covers the X electrode lines $X_1, \ldots, X_n$ and the Y electrode lines $Y_1, \ldots, Y_n$. The protective layer 104 is formed on the upper dielectric layer 102 to protect the panel 1 from a strong electric field. A plasma forming gas is filled in the discharging space 108.

A typical driving method for the above AC PDP includes an initialization process, an addressing process, and a display sustain process sequentially performed in a unit sub-field. The initialization process provides uniform states of electric charges of the display cells that will be driven. The addressing process provides desired charges for selected and non-selected cells. In the display sustain process, discharging operations are performed in the selected cells. Here, discharging operations generate plasma, which emits ultraviolet rays that excite the phosphor layers 112, thereby generating visible light to display an image.

In this case, a plurality of unit sub-fields are included in a unit frame, and a desired gray level may be displayed by the display sustain time of the sub-fields.

FIG. 2 shows a general driving apparatus in the PDP 1 shown in FIG. 1.

Referring to FIG. 2, the driving apparatus of the PDP 1 includes an image processor 200, a logic controller 202, an address driver 206, an X driver 208, and a Y driver 204. The image processor 200 generates internal image signals, such as 8 bit red (R), green (G), and blue (B) color image data, a clock signal, and vertical and horizontal synchronization signals. The logic controller 202 generates driving control signals $S_A$, $S_X$, and $S_Y$. The address driver 206 processes the address control signal $S_A$ to generate address signals, and applies the address signals to the address electrode lines $A_1, \ldots, A_m$. The X driver 208 processes the X driving control signal $S_X$ and applies it to the X electrode lines $X_1 \ldots X_n$. The Y driver 204 processes the Y driving control signal $S_Y$ and applies it to the Y electrode lines $Y_1 \ldots Y_n$.

FIG. 3 is a circuit diagram showing an example of the address driver 206 of FIG. 2. Referring to FIG. 3, the address driver 206 generates address signals $S_{A1}, \ldots, S_{Am}$ by processing the address control signal $S_A$ input from the logic controller 202. The address control signal $S_A$ includes upper control signals $A_{1U} \ldots A_{mU}$, for switching upper switches $F_{1U} \ldots F_{mU}$, and lower control signals $A_{1L} \ldots A_{mL}$, for switching lower switches $F_{1L} \ldots F_{mL}$. The upper and lower switches $F_{1U} \ldots F_{mU}$ and $F_{1L} \ldots F_{mL}$ are connected to the address electrodes $A_1 \ldots A_m$, which are first electrodes of panel capacitors $C_{p1} \ldots C_{pm}$, respectively. The upper switches $F_{1U} \ldots F_{mU}$ are also connected to an address power source Va. The lower switches $F_{1L} \ldots F_{mL}$ are also connected to ground.

FIG. 4 shows a typical address-display separation (ADS) driving method for the Y electrode lines in the PDP of FIG. 1.

Referring to FIG. 4, a unit frame is divided into 8 sub-fields SF1 . . . SF8 for time division gray scale display. The sub-fields SF1 . . . SF8 are further divided into reset periods (not shown), address periods A1 . . . A8, and sustain periods S1 . . . S8.

In the address periods A1 . . . A8, display data signals are applied to the address electrode lines $A_1 \ldots A_m$ of FIG. 1, and at the same time, scan pulses are sequentially applied to the corresponding Y electrode lines $Y_1 \ldots Y_n$.

In the sustain periods $S_1 \ldots S_8$, sustain discharging pulses are alternately applied to the Y electrode lines $Y_1 \ldots Y_n$ and the X electrode lines $X_1 \ldots X_n$ to display a desired image.

The brightness of the PDP is proportional to the lengths of the sustain periods S1 . . . S8. The length of the sustain periods S1 . . . S8 in the unit frame is 255T (T is a unit time). Here, a time corresponding to $2^{n-1}$ is set for the sustain period $S_n$ in nth sub-filed $SF_n$. Accordingly, when the sub-fields to be displayed are selected appropriately among the 8 sub-fields, 256 gray levels may be displayed, including a zero gray level.

FIG. 5 is a timing diagram showing driving signals that may be applied to the AC PDP of FIG. 1 when utilizing the ADS method. Referring to FIG. 5, the sub-field SF includes a reset period PR, an address period PA, and a sustain period PS.

In the reset period PR, reset pulses are applied to all scan lines to initialize the wall charges for all display cells. In the address period PA, a bias voltage $V_e$ is applied to the common electrodes X, and the scan electrodes $Y_1 \ldots Y_n$ and the address electrodes $A_1 \ldots A_m$ are turned on simultaneously to select cells for displaying an image. In the sustain period PS, sustain pulses $V_S$ are alternately applied to the common electrodes X and the scan electrodes $Y_1 \ldots Y_n$, while a low level voltage $V_G$ is applied to the address electrodes $A_1 \ldots A_m$.

In performing the addressing operations as shown in FIG. 4 and FIG. 5, the charges charged in the display cells at high levels are discharged through ground terminals if a next signal is at the low level. Additionally, in order to convert a display cell that is at the low level, in the previous scan line, into the high level, a power source supplies all required charges.

In other words, when addressing display cells according to the conventional driving method, available charges previously stored in an address electrode panel capacitor are not used, which unnecessarily increases power consumption. If the address operations are performed at every sub-field, unnecessary power consumption may significantly increase.

SUMMARY OF THE INVENTION

The present invention provides a panel driving circuit that may improve power consumption efficiency by reducing power consumption during address operations.

Additional features of the invention will be set forth in the description which follows, and in part will be apparent from the description, or may be learned by practice of the invention.

The present invention discloses a panel driving apparatus for selecting display cells in response to an address signal, the apparatus comprising an address power controller for blocking an address power source of at least two panel capacitors and coupling the panel capacitors during a period between a scan line signal and a next scan line signal, so that the panel capacitors share electric charges. An address driver generates display data in response to the address signal by performing a switching operation.

The present invention also discloses a display panel comprising an address electrode, a scan electrode, and display cells formed by the address electrode and the scan electrode. An address power controller blocks an address power source of at least two panel capacitors and couples the panel capacitors during a period between a scan line signal and a next scan line signal, so that the panel capacitors share electric charges. An address driver generates display data in response to the address signal by performing a switching operation.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Hereinafter, structure and operations of a panel driving apparatus according to an exemplary embodiment of the present invention will be described with reference to accompanying drawings. The panel driving apparatus of the present invention may be used for performing an addressing operation to select cells to be displayed.

Figure 6:
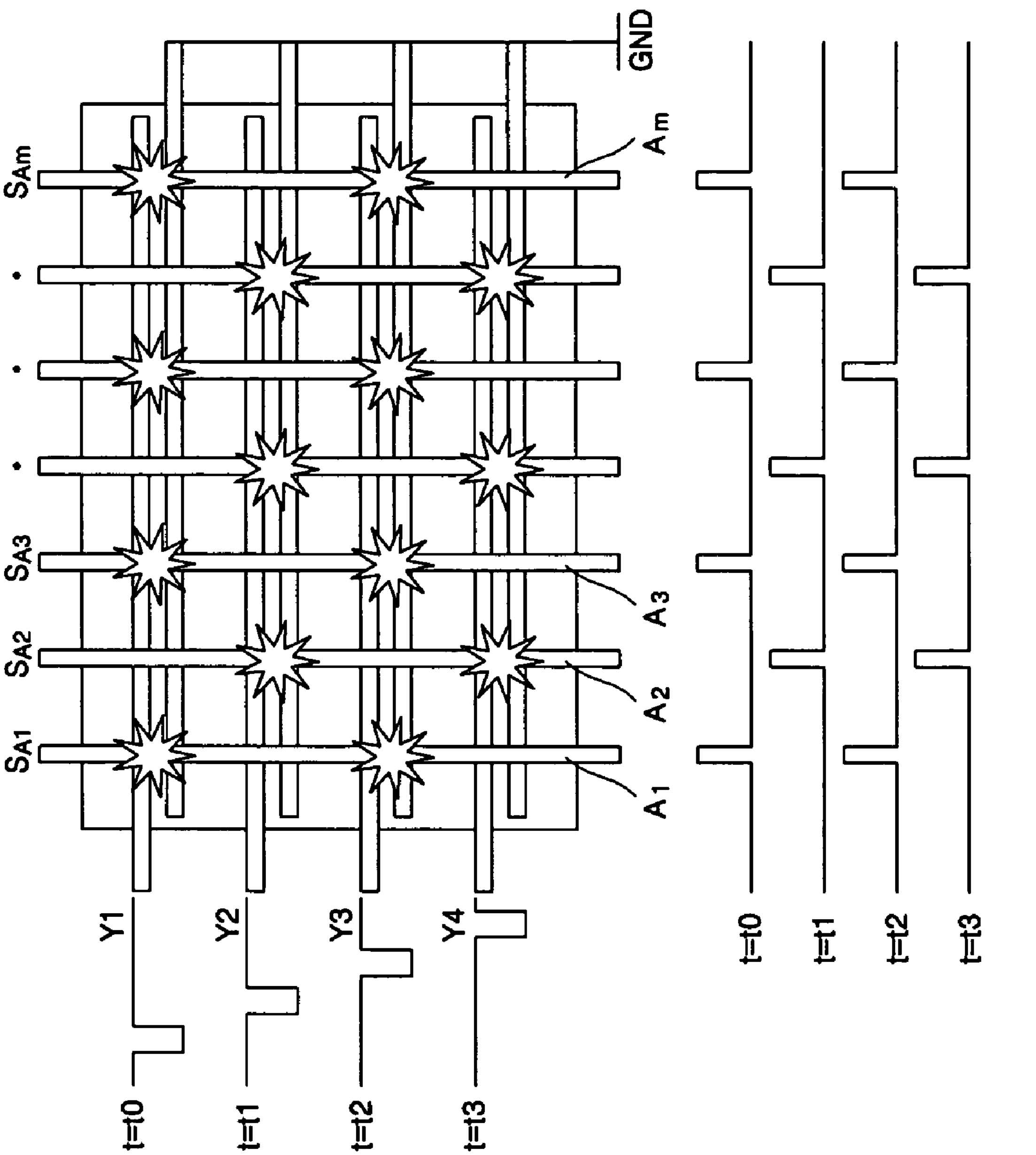
FIG. 6 shows display states of cells written in an address period.

FIG. 6 shows states of cells in an address period. The cells to be displayed and the cells not to be displayed are arranged in a zigzag form.

Figure 7:
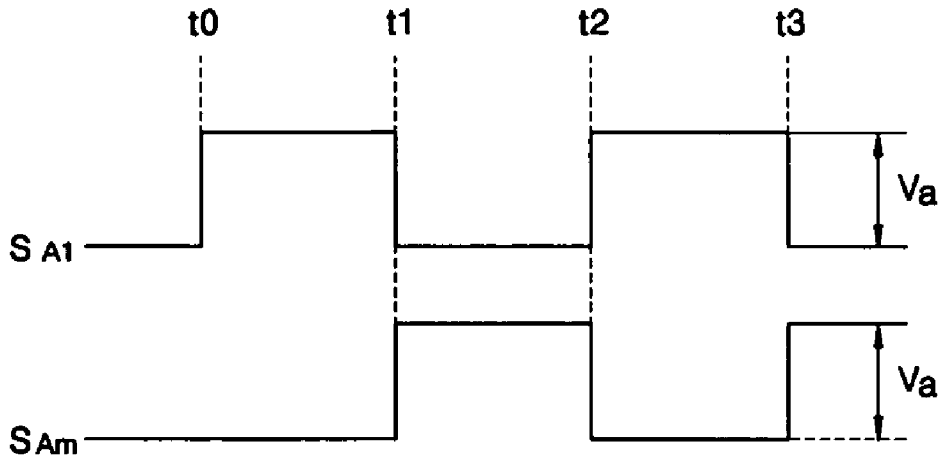
FIG. 7 shows address signals input into address electrodes of FIG. 6.

Referring to FIG. 6, address signals $S_{A1} \ldots S_{Am}$ are input into address electrodes $A_1 \ldots A_m$ at scanning times of scan lines $Y_1 \ldots Y_4$. FIG. 7 shows the input signals at the address electrodes $A_1 \ldots A_m$.

FIG. 7 shows examples of the address signals $S_{A1}$ and $S_{Am}$ that are input into the first address electrode $A_1$ and the $m^{th}$ address electrode $A_m$.

Referring to FIG. 7, at time $t_0$, the first address signal $S_{A1}$ is at a high level, and the $m^{th}$ address signal $S_{Am}$ is at a low level. At time $t_1$, the first address signal $S_{A1}$ becomes the low level, and the $m^{th}$ address signal $S_{Am}$ becomes the high level. At times $t_2$ and $t_3$, previous states of the first address signal $S_{A1}$ and the $m^{th}$ address signal $S_{Am}$ invert, as is the case at time $t_1$.

However, in performing the address operation, charges accumulated in the address displaying cells at the high level may be discharged through a ground terminal when the next signal is at the low level. Additionally, in order to invert the display cell that is at the low level into the high level, a power source terminal may be required to supply all required charges.

Figure 1:
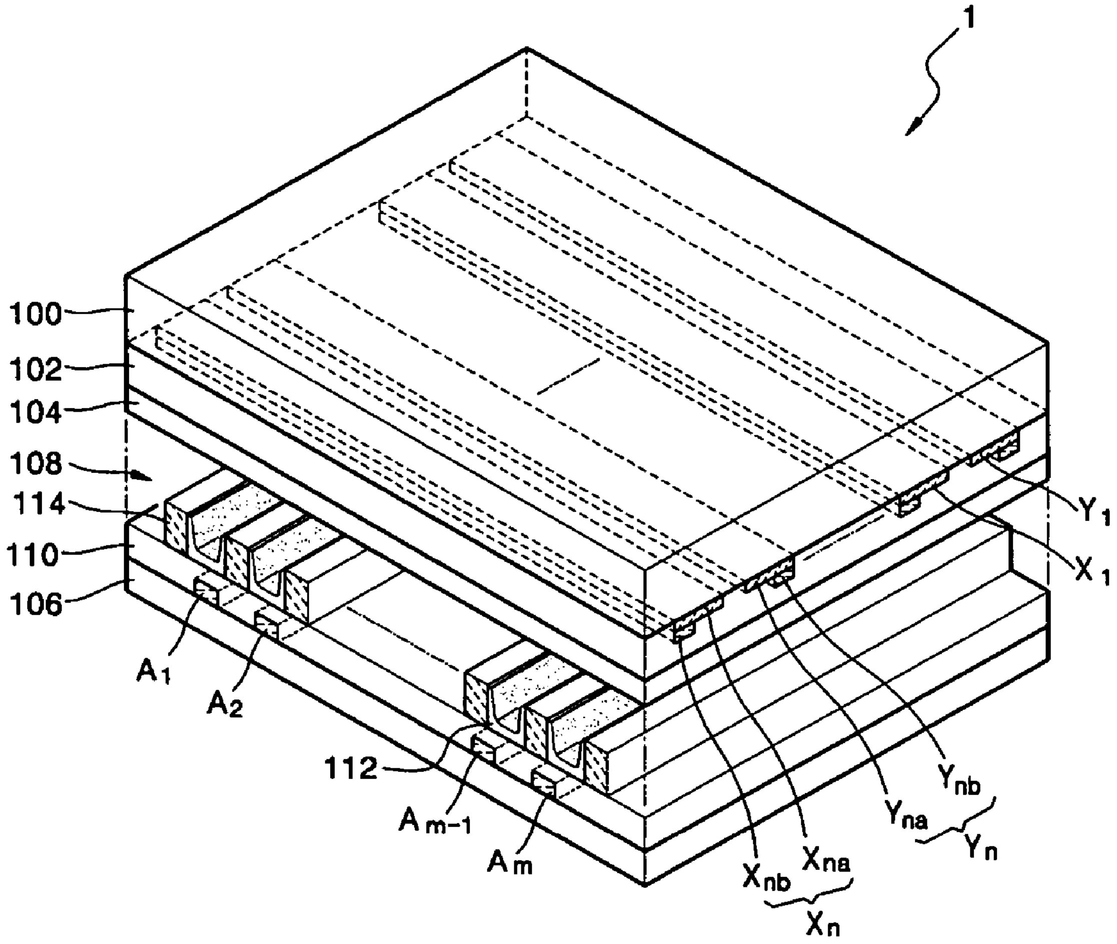
FIG. 1 (PRIOR ART)
FIG. 1 is a perspective view showing a conventional 3-electrode surface discharge type PDP.
Figure 2:
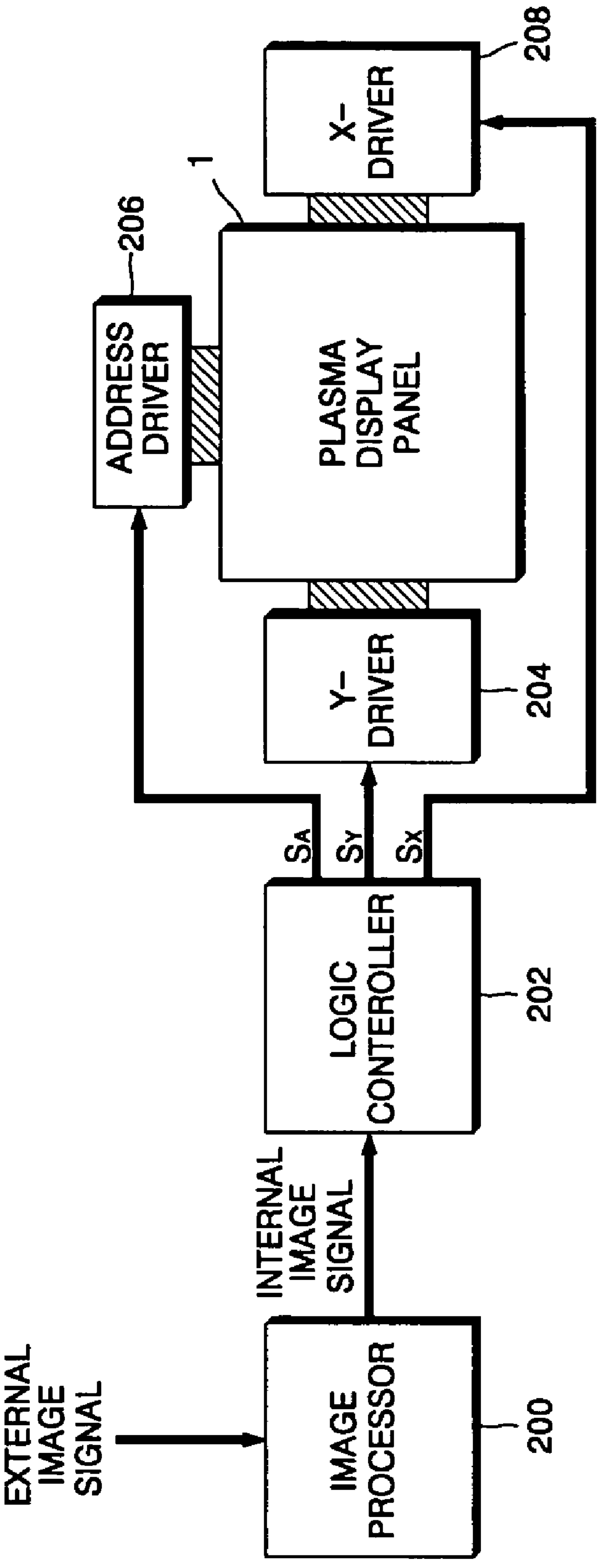
FIG. 2 (PRIOR ART)
FIG. 2 is a block diagram showing a conventional driving apparatus of the PDP shown in FIG. 1.
Figure 3:
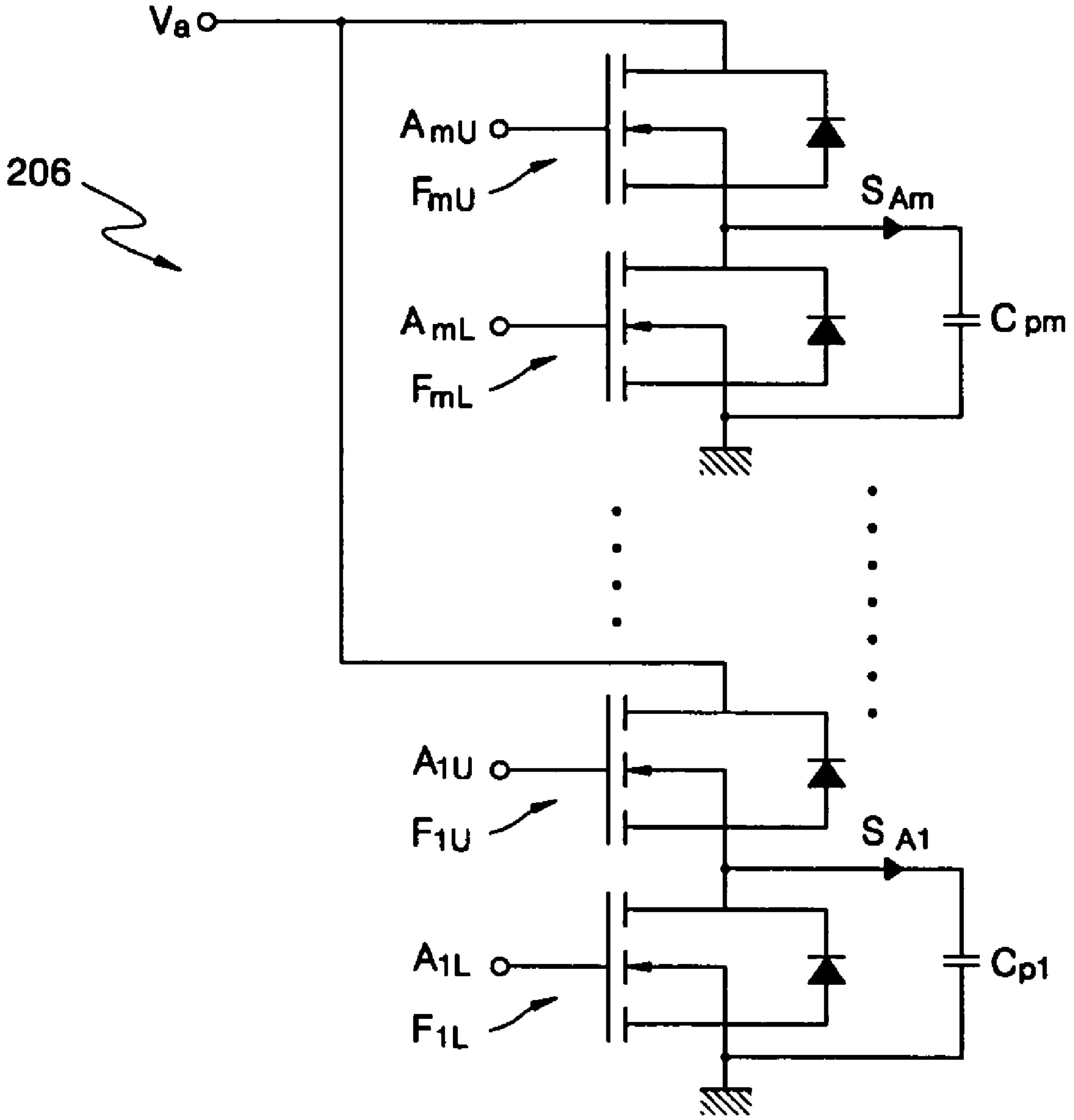
FIG. 3 (PRIOR ART)
FIG. 3 is a circuit diagram showing an address driver of FIG. 2.
Figure 4:
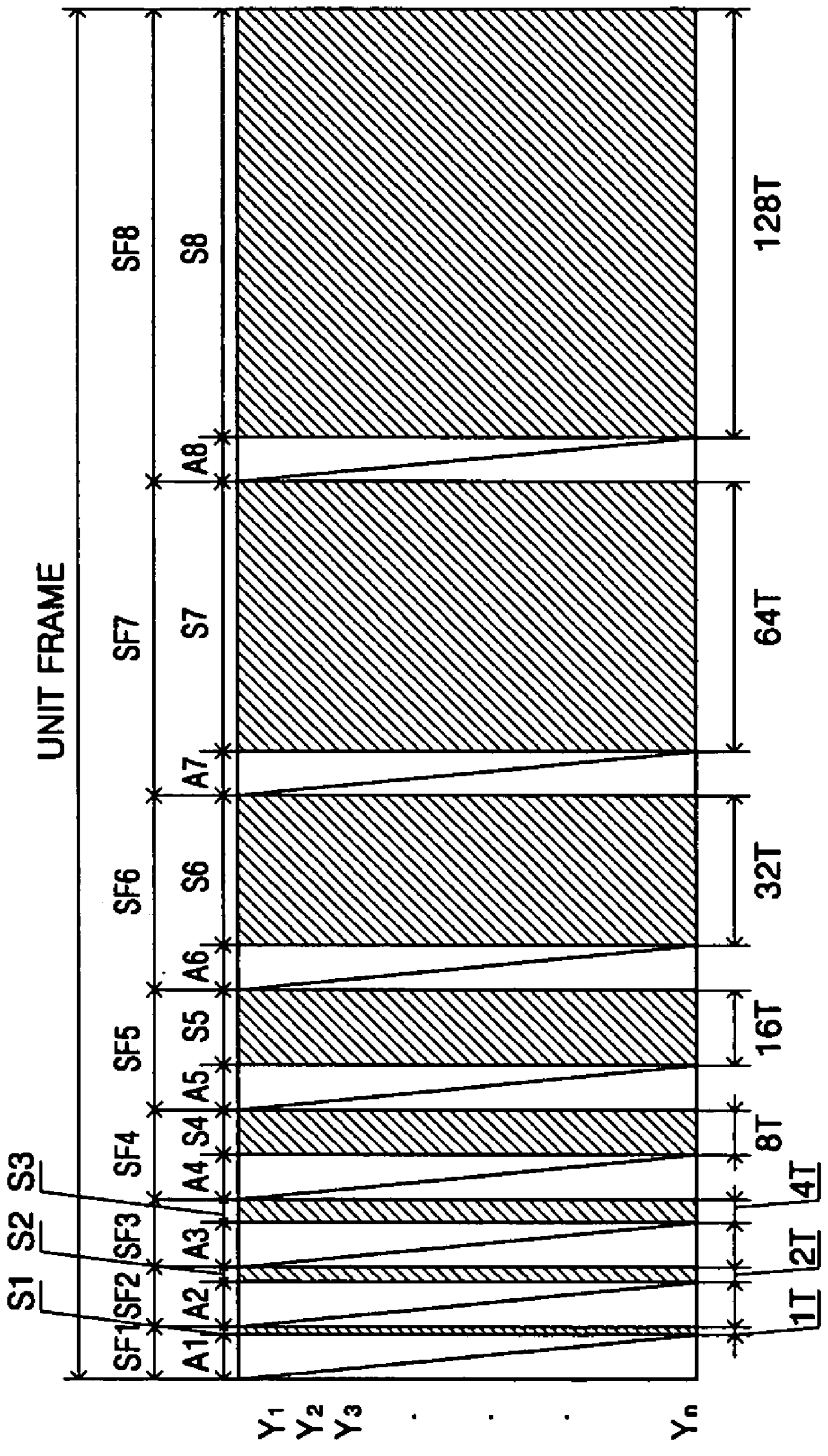
FIG. 4 (PRIOR ART)
FIG. 4 shows an address-display separation (ADS) driving method for Y electrode lines in the PDP of FIG. 1.
Figure 5:
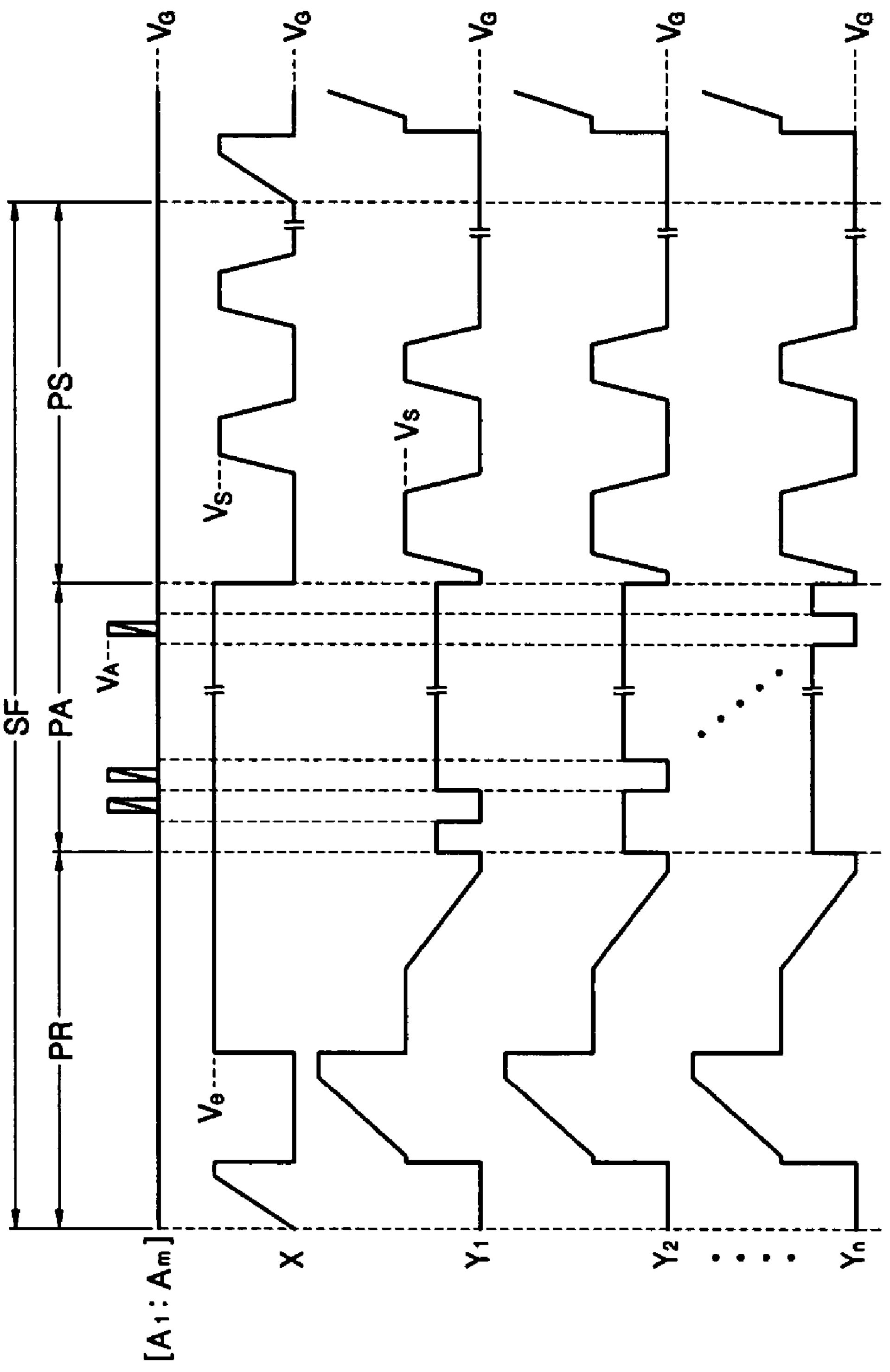
FIG. 5 (PRIOR ART)
FIG. 5 shows an example of a driving signal for the PDP of FIG. 1.

Consequently, when previously stored charges in an address electrode panel capacitor are not used to charge cells from the low to the high level, a power source supplies the required charges, which unnecessarily increases power consumption. When the address operation is performed at every sub-field as shown in FIGS. 4 and 5, the unnecessary power consumption may further increase.

Here, a panel capacitor is a panel including electrodes and dielectric materials operating as a capacitor of a driving circuit.

Figure 8:
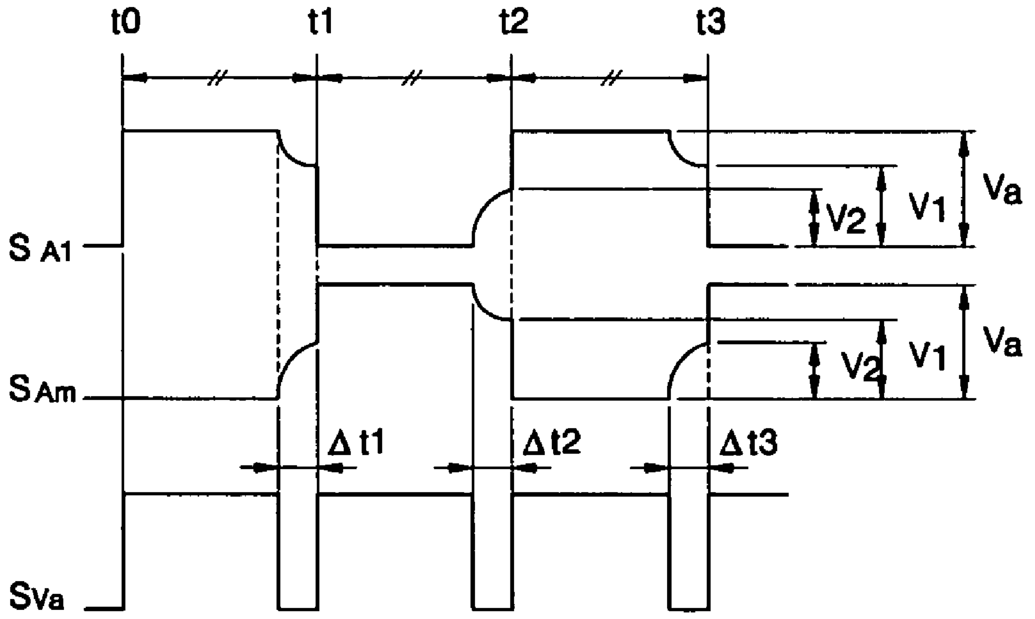
FIG. 8 is a timing view showing an address driving signal for describing an address driving method of a PDP according to an exemplary embodiment of the present invention.

FIG. 8 is a timing view showing the address driving signal for describing the address driving method of a display panel according to an exemplary embodiment of the present invention.

When an address power switching signal $S_{Va}$ is at the low level during the times $\Delta t_n$, at least two address electrodes are coupled, which equalizes charges stored in the capacitors of those electrodes.

Referring to FIG. 8, at time $t_0$, the high level voltage is applied to the first address electrode $A_1$, and the low level voltage is applied to the $m^{th}$ address electrode $A_m$. When the first address electrode $A_1$ and the $m^{th}$ address electrode $A_m$ are coupled during a first common connecting period $\Delta t_1$, charges discharged from the first address electrode $A_1$ may be charged in the $m^{th}$ address electrode $A_m$. That is, during the first common connecting period $\Delta t_1$, the first address signal $S_{A1}$ falls to $V_1$, and the $m^{th}$ address signal $S_{Am}$ rises to $V_2$. Here, values of $V_1$ and $V_2$ may be differentiated at every address electrode by the elements that determine a time constant such as the panel capacitor and line resistance. Additionally, if the equalization process is longer, the average electric potential may converge as $V_1=V_2=0.5V_a$.

At time $t_1$, the low level voltage is applied to the first address electrode $A_1$, and the high level voltage is applied to the $m^{th}$ address electrode $A_m$. Conventionally, a power source may charge the $m^{th}$ address electrode $A_m$ from the low level to the high level, and the charges that are charged in the first address electrode $A_1$ are discarded to the ground terminal.

However, according to the address driving method of the present exemplary embodiment, the first address electrode $A_1$ only discards the charges corresponding to the voltage $V_1$, and an address power source supplies charges corresponding to the voltage difference of $V_a-V_2$ to the $m^{th}$ address electrode $A_m$. Therefore, as shown in FIG. 8, the charges corresponding to the voltage $V_2$ may be saved and charged to the $m^{th}$ electrode during the time $\Delta t_1$, which reduces the power consumption at the address power source because the power source does not have to supply all required charges to charge the $m^{th}$ address electrode to the high level.

When the first address electrode $A_1$ and the $m^{th}$ address electrode $A_m$ are coupled during a second common connecting period $\Delta t_2$, the charges corresponding to voltage $V_2$ may be saved at the first address electrode $A_1$.

The address driving method shown in FIG. 8 is described for two address electrodes, however, it may be applied to all address electrodes.

Figure 9:
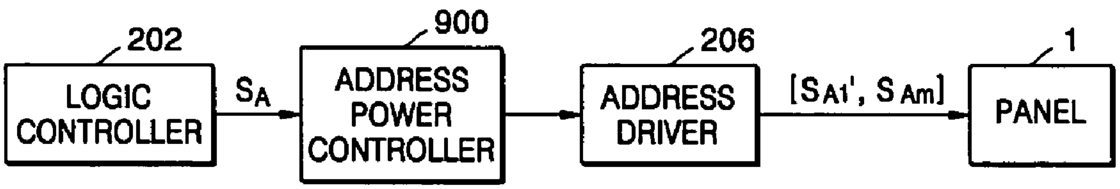
FIG. 9 is a block diagram showing an address driving apparatus and panel driving elements according to an exemplary embodiment of the present invention.

FIG. 9 is a block diagram showing an address driving apparatus, and panel driving elements connected thereto, according to an exemplary embodiment of the present is invention.

The address driving apparatus drives the display panel 1, on which scan electrodes $Y_1 \ldots Y_n$ and address electrodes $A_1 \ldots A_m$ cross to form display cells. In FIG. 9, an address power controller 900 is included in the apparatus.

The address power source of two or more panel capacitors $C_{p1} \ldots C_{pm}$ may be blocked and the panel capacitors $C_{p1} \ldots C_{pm}$ may be coupled during a period between a scan line signal and a next scan line signal, which may allow the panel capacitors $C_{p1} \ldots C_{pm}$ to share charges.

The address power control unit 900 controls an address power source input into the address driver 206, which generates address signals $S_{A1} \ldots S_{Am}$ by a switching operation in response to the address control signal $S_A$, which is input from the logic controller 202 and includes upper control signals $A_{1U} \ldots A_{mU}$ and lower control signals $A_{1L} \ldots A_{mL}$.

Figure 10:
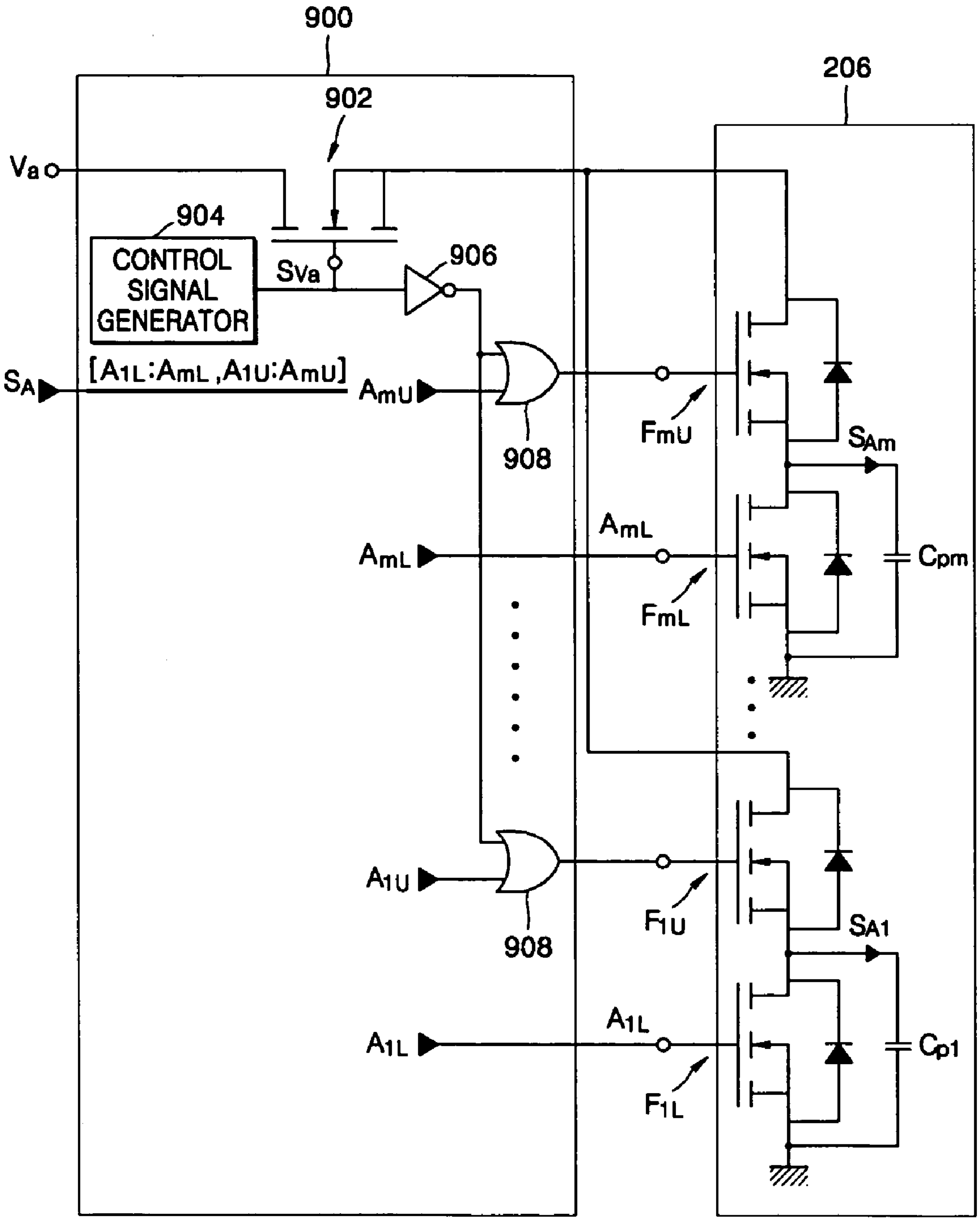
FIG. 10 is a circuit diagram showing an example of the apparatus of FIG. 9.

FIG. 10 is a circuit diagram showing an exemplary embodiment of the device shown in FIG. 9. Referring to FIG. 10, the address power controller 900 includes a power switch 902, which is coupled to the address power source $V_a$ and an upper address switch $F_{1U} \ldots F_{mU}$ of the address driver 206. When the power switch 902 turns off, and two or more upper address switches $F_{1U} \ldots F_{mU}$ turn on, at least two panel capacitors $C_{P1} \ldots C_{Pm}$ are coupled. Therefore, the address power controller 900 may include a control signal generator 904, an inverter 906, and a logical sum gate 908.

The control signal generator 904 generates an address power switching signal $S_{Va}$ that turns the power switch 902 off during a period between the scan line signal and the next scan line signal.

The inverter 906 inverts the address power switching signal $S_{Va}$.

The output of the inverter 906 and the upper control signals $A_{1U} \ldots A_{mU}$ are input into the logical sum gates 908, which each have an output coupled to one of the upper address switches $F_{1U} \ldots F_{mU}$. The lower control signals $A_{1L} \ldots A_{mL}$ are coupled to the lower address switches $F_{1L} \ldots F_{mL}$.

The upper address switches $F_{1U} \ldots F_{mU}$ and the lower address switches $F_{1L} \ldots F_{mL}$ output address signals $S_{A1} \ldots S_{Am}$ for driving the panel capacitors $C_{P1} \ldots C_{Pm}$.

The present invention may be applied to a display device that selects cells to be displayed in an address period and discharges the selected cells in a sustain period. For example, the present invention may also be applied to a direct current (DC) PDP, an electroluminescence (EL) display device, and a liquid crystal display (LCD) device, as well as the alternating current (AC) PDP.

As described above, according to the panel driving apparatus of the present invention, charges that are charged in a previous address electrode line and could be discarded to the ground terminal at the next address electrode line may be shared between panel capacitors, thereby reducing power consumption and improving efficiency during addressing operations.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A panel driving apparatus for selecting display cells in response to an address control signal, the apparatus comprising:

an address power controller to block an address power source of at least two address electrodes, and to couple the address electrodes during a period between a scan line signal and a next scan line signal, so that the address electrodes share electric charges; and an address driver for generating address signals in response to the address control signal by performing a switching operation.

2. The panel driving apparatus of claim 1, wherein the address power controller comprises:

a power source switch coupled to the address power source and to an upper address switch of the address driver, wherein at least two address electrodes are coupled and at least two upper address switches turn on when the power source switch turns off.

3. The panel driving apparatus of claim 2, wherein the address power controller further comprises:

a control signal generator for generating a control signal for turning the power source switch off during the period between the scan line signal and the next scan line signal;

an inverter for inverting the control signal; and a logical sum gate, wherein the address control signal and an output of the inverter are input into the logical sum gate;

wherein an output of the logical sum gate is coupled to the upper address switch.

4. A display panel, comprising:

a first address electrode;

a second address electrode;

a scan electrode;

display cells formed by the first address electrode, the second address electrode, and the scan electrode;

an address power controller to block an address power source of the first address electrode and the second address electrode, and to couple the first address electrode and the second address electrode during a period between a scan line signal and a next scan line signal, so that the first address electrode and the second address electrode share electric charges; and an address driver for generating address signals in response to an address control signal by performing a switching operation.

5. The display panel of claim 4, wherein the address power controller comprises:

a power source switch coupled to the address power source and to an upper address switch of the address driver, wherein the first address electrode and the second address electrode are coupled and at least two upper address switches turn on when the power source switch turns off.

6. The display panel of claim 5, wherein the address power controller further comprises:

a control signal generator for generating a control signal for turning the power source switch off during the period between the scan line signal and the next scan line signal;

an inverter for inverting the control signal; and a logical sum gate, wherein the address control signal and an output of the inverter are input into the logical sum gate;

wherein an output of the logical sum gate is coupled to the upper address switch.

7. The display panel of claim 4, wherein the display panel is a plasma display panel, a liquid crystal display panel, or an electroluminescence display panel.

* * * * *